United States Patent [19]

Mumcu

[11] 4,345,064
[45] Aug. 17, 1982

[54] PREPARATION OF POLYETHER ESTER AMIDES

[75] Inventor: Salih Mumcu, Marl, Fed. Rep. of Germany

[73] Assignee: Chemische Werke Hüls AG, Marl, Fed. Rep. of Germany

[21] Appl. No.: 180,617

[22] Filed: Aug. 25, 1980

[30] Foreign Application Priority Data

Sep. 13, 1979 [DE] Fed. Rep. of Germany ....... 2936977

[51] Int. Cl.³ ...................... C08G 69/44; C08G 63/42
[52] U.S. Cl. .................................. 528/288; 525/296; 525/419; 528/292; 528/318
[58] Field of Search ............... 528/288, 292, 289, 323, 528/326, 318; 525/926, 419

[56] References Cited

U.S. PATENT DOCUMENTS

| | | | |
|---|---|---|---|
| 2,401,607 | 6/1946 | Bruson | 260/464 |
| 3,428,710 | 2/1969 | Daumiller et al. | 525/424 |
| 3,489,816 | 1/1970 | Hornig et al. | 570/230 |
| 3,838,076 | 9/1974 | Moss et al. | 521/164 |
| 3,847,992 | 11/1974 | Moss | 564/479 |
| 3,944,629 | 3/1976 | Hendrick | 528/275 |
| 3,993,709 | 11/1976 | Hendrick et al. | 528/288 |
| 4,182,843 | 1/1980 | Haupt et al. | 528/326 |
| 4,207,410 | 6/1980 | Burzin et al. | 528/288 |
| 4,252,920 | 2/1981 | Deleens et al. | 525/926 |

FOREIGN PATENT DOCUMENTS

| | | |
|---|---|---|
| 2135770 | 1/1972 | Fed. Rep. of Germany . |
| 2658714 | 7/1977 | Fed. Rep. of Germany . |
| 897624 | 5/1962 | United Kingdom ................ 528/318 |
| 1211118 | 11/1970 | United Kingdom . |
| 1473972 | 5/1977 | United Kingdom . |

OTHER PUBLICATIONS

"Encyclopedia of Chemical Technology" Kirk-Othmer 2nd Ed., vol. 16, pp. 88–105, 1969.

Primary Examiner—Theodore Morris
Attorney, Agent, or Firm—Wells & Wells

[57] ABSTRACT

A process for preparing polyether amides of polyether ester amides by polycondensing polyamides bearing carboxyl end groups with polyethers bearing hydroxyl end groups and/or amino end groups at ordinary or reduced pressure, in the presence of catalysts, the polyamides bearing the end groups and the polyethers bearing the end groups first being treated at temperatures from about 200° to 300° C. at a water vapor pressure of 5 to 25 bars and with mechanical agitation, and wherein upon removing the water by expansion, the polycondensation is carried to completion. The present invention differs from the prior art in that the polyamides bearing carboxyl groups being used are prepared by melting a mixture of lactams having at least 8 C atoms with dicarboxylic acids in the molar ratio of 100/1 to 100/15 in the presence of a catalyst, in an inert gas atmosphere, at atmospheric pressure and in the absence of water at temperatures from 230° to 300° C., heating in the molten form lasting until the lactams have been reacted at least 98% to form a prepolymer. Water and the polyethers are then added to the prepolymer, the autoclave is closed, and the process continued.

8 Claims, No Drawings

PREPARATION OF POLYETHER ESTER AMIDES

CROSS-REFERENCES TO RELATED APPLICATIONS

Applicant claims priority under 35 USC 119 for application No. P 29 36 977.5, filed Sept. 13, 1979 in the Patent Office of the Federal Republic of Germany.

Copending U.S. patent application of Salih Mumcu et al., filed July 10, 1980, and having Ser. No. 169,111 is incorporated herein. This copending application, which is not yet part of the prior art, discloses a method for manufacturing polyether ester amides by polycondensing at ordinary or reduced pressure, optionally in the presence of catalysts:

(a) polyamides having carboxyl end groups with polyethers having hydroxyl end groups and amino end groups;

(b) polyamides having carboxyl end groups with polyethers having amino end groups; or (c) polyamides having amino end groups with polyethers having carboxyl end groups; and prior to polycondensing the end group bearing polyamides and end group bearing polyethers are treated at temperatures from about 200° to 300° C. and at a water vapor pressure of about 5 to 25 bars with mechanical agitation and after water is removed by decompression the polycondensation is carried out.

BACKGROUND OF THE INVENTION

The field of this invention is polyether ester amides.

The state of the art of preparing polyether ester amides may be ascertained by reference to British Pat. Nos. 1,211,118 and 1,473,972; West German Published Application No. 2,658,714 and U.S. Pat. Nos. 3,428,710; 3,489,816; 3,944,629; 3,993,709; and 4,207,410, the disclosures of which are incorporated herein.

Polyamide plastics, additives useful therein, their properties and methods of processing, machining and finishing are disclosed in the Kirk-Othmer, "Encyclopedia of Chemical Technology," 2nd Ed. (1968) Vol. 16, pp. 88–105, the disclosure of which is incorporated herein.

The preparation of polyether ester amides, also referred to as block polyamide polyether esters, is known.

The following procedures are manufacturing processes of the prior art; the polycondensation of a polyamide forming monomer, for instance lactams, omega-aminocarboxylic acids, or equivalent amounts of dicarboxylic acids and diamines with a polyether having end located amino groups in the presence of dicarboxylic acids or with a polyether having end located carboxyl groups in the presence of diamines; and polycondensation of a polyether with polyamide oligomers including either carboxyl end groups or amine end groups. These prior art processes are disclosed in West German Published Application No. 2,658,714; British Pat. Nos. 1,211,118 and 1,473,972 and U.S. Pat. Nos. 3,428,710; 3,489,816 and 4,207,410.

It is known that polyethers and polyamides are mutually incompatible. Due to the heterogeneity of the reaction components, polycondensation takes place very slowly. Furthermore, only molded materials having a high extract content and relatively low molecular weights are obtained, so that inadequate stability is incurred in the molded articles made by injection molding and especially by the extrusion process. The use of the required high concentrations of catalysts causes insufficient stability with respect to hydrolysis in the molded materials.

The U.S. patent application of Salih Mumcu et al., filed July 10, 1980 and having Ser. No. 169,111 succeeds in obtaining advantageous molding materials by subjecting the polyethers and polyamides, which are present as polyamides bearing carboxyl end groups and polyethers bearing hydroxyl end groups or amino end groups, or as amino end-group bearing polyamides and carboxyl end-group bearing polyethers, to homogenization under water vapor pressure prior to the polycondensation.

Advantageously, polyamides are used which are obtained by hydrolytic polymerization in the presence of dicarboxylic acids. In the higher member lactams, the opening of the lactam rings under water vapor pressure of 15 to 20 bars of pressure as a rule takes substantial time, generally from 8 to 12 hours.

While it is known to manufacture polyether ester amides so that the opening of the lactam rings is carried out without water vapor pressure in the presence of dicarboxylic acids and diols or oligo ether diols or oligo ether esters, the products obtained in this manner contain an excessive amount of unreacted monomer despite a long initial condensation time of up to 24 hours.

The molecular masses of these polymers made without water vapor are too low, and therefore they are not suitable for the manufacture of molded articles by the extrusion process as disclosed in the examples of West German Published Application No. 21 35 770.

SUMMARY OF THE INVENTION

Having in mind the limitations of the prior art, it is an object of the present invention to prepare polyether ester amides from polyamides bearing carboxyl end groups obtained at ordinary pressure in the absence of water. Furthermore, it is another object to open the lactam rings in a short time, with a minimum of catalyst being required, in order to obtain products which are adequately stable with respect to hydrolysis, and a further object is that the thermoplastic polyether ester amides obtained should be sufficiently high in molecular mass so that they can be processed into molded articles by the extrusion method.

These objects are achieved according to the present invention wherein:

(a) polyamides having carboxyl end groups are used that are obtained by melting a mixture of lactams having at least 8 C atoms and dicarboxylic acids in a molar ratio of 100/1 to 100/15 in the presence of a catalyst and in an inert gas atmosphere at ordinary pressure and in the absence of water, at temperatures from about 230° to 300° C., the melting continuing until the lactams are reacted at least 98%;

(b) water and sufficient polyether to form the polyether ester amide is mixed with the reaction product of (a);

(c) The mixture of (b) is treated at a temperature between about 200° to 300° C. and under the vapor pressure of the water added in (b) to about 5 to 25 bars with mechanical agitation;

(d) the water from (c) is removed by decompression; and (e) the product of (d) is polycondensed.

DESCRIPTION OF THE PREFERRED EMBODIMENTS

Capryllactam, lauryl lactam or their mixtures are used as the lactams having at least 8 C atoms. Lauryl lactam is preferably used.

Linear aliphatic dicarboxylic acids having the general formula HOOC—$(CH_2)_x$—COOH are used as the dicarboxylic acids, where x has a value between 4 and 11, and/or branched aliphatic dicarboxylic acids are used. Illustratively, these dicarboxylic acids are adipic acid, trimethyl adipic acid, pimelic acid, suberic acid, azelaic acid, sebacic acid and decane dicarboxylic acid.

Furthermore, cycloaliphatic and/or aromatic dicarboxylic acids having at least 8 C atoms such as hexahydroterephthalic acid, terephthalic acid, isophthalic acid, phthalic acid or naphthalene dicarboxylic acid are useful. Decane dicarboxylic acid and isophthalic acid are preferred.

The polyethers used are derived from ethylene oxide, propylene oxide and tetrahydrofuran. The polyethers are homopolymers and/or copolymers. Mixtures of homopolymers and/or copolymers also may be used. The mean numerical molecular mass of the polyethers is between 160 and 3000, preferably between 300 and 2200, especially between 500 and 1200. The polyethers contain OH groups and/or $NH_2$ groups as end groups. Polytetrahydrofuran with OH end groups is preferredly used. The manufacture of polyalkylene oxides with $NH_2$ end groups can be carried out using known methods from West German Published Application No. 15 70 542, and U.S. Pat. Nos. 3,838,076; 3,897,992 and 2,401,607.

Advantageously, the molar ratio of lactams to dicarboxylic acids is from 100/2 to 100/10 and preferably 100/3 to 100/7.

Suitable catalysts are phosphoric acid, amine salts of phosphoric acid, zinc acetate and calcium acetate, in amounts of about 0.01 to 0.3% by weight referred to the total substance. Phosphoric acid is preferred in proportions of 0.02 to 0.1% by weight. These minor proportions are without adverse effect on hydrolytic product stability. The amount of catalyst may be the lower, the lower the molar ratio of lactam to dicarboxylic acid.

The products appropriately are prepared in an agitated autoclave. However, the acidolytic opening of the lactam rings is carried out in the absence of water in a nitrogen atmosphere in a simple stirred vessel, and the polyamide so obtained contains the carboxyl groups which can then be further processed thereupon in an agitated autoclave.

The lactam rings are opened under a $N_2$ atmosphere at 230° to 300° C., preferably at 250° to 290° C., and polymerized. To ensure better exclusion of air, $N_2$ gauge pressures of for instance 0.5 bars are used.

It takes less than 8 hours to open the rings. For the especially preferred molar ratio of the input substances, a time of from 5 to 1½ hours suffices. In that period of time, the lactam monomers are reacted 98 to 99.7%.

Thereupon, the ether component is added in a molar ratio of polyether/dicarboxylic acid content=1/0.95 to 1/1.05, preferably 1/1, at about 250° to 290° C., and then enough water is introduced into the reactor so that the water vapor pressure in it amounts to 5 to 25 bars, preferably 10 to 20 bars. The amount of water used depends on the temperature of the substance of reaction, the reactor size, the amount the reactor is filled and the molar ratio of the lactams to the dicarboxylic acids. When the reactor is filled about 50%, the required water vapor pressure is obtained using about 1 to 30% by weight, preferably 2 to 20% by weight of water referred to the lactams.

Stirring proceeds at this water vapor pressure and at a temperature of about 200° to 300° C., preferably 220° to 280° C., for 15 minutes to 4 hours, preferably 30 minutes to 2 hours. After relieving the excess pressure by expansion of the water vapor, polycondensation takes place conventionally at atmospheric pressure with $N_2$ passing over or in a vacuum between about 100 mbars and 1 mbar, preferably 90 mbars and 5 mbars, at temperatures from about 250° to 290° C., preferably 260° to 280° C.

The desired relative solution viscosities of the polyether amides and polyether ester amides so obtained are between about 1.4 and 2.4, preferably 1.6 and 2.2, measured according to German Industrial Standard DIN 53 727 in m-cresol at 25° C.

The polyether amides and polyether ester amides of the present invention may contain additives such as stabilizers against degradation by light and thermo-oxidation, flame-proofing agents, dyestuffs, pigments, softeners, auxiliary processing agents and fillers, which are added before, during or after the polycondensation, as disclosed in Kirk-Othmer, ibid., pp. 92–95.

The polyether amides and polyester ester amides of the present invention are suitable for the manufacture of molded articles of high impact strength at low temperatures, such as tubes, films and foils obtained by injection molding or extrusion, and the products can be machined and finished as disclosed in Kirk-Othmer, ibid., pp. 98–104.

The present invention is explained in more detail in relation to illustrative embodiments shown in the specific examples which follows.

The lactam contents in the specific examples were determined by gas chromatography.

The molecular masses listed are mean numerical molecular masses.

EXAMPLE 1

295.5 kg of lauryl lactam (1,500 moles); 26.38 kg of decane dicarboxylic acid (114.5 moles) and 0.22 kg of phosphoric acid are heated for 2½ hours to 280° C. under a $N_2$ atmosphere in a 1 $m^3$ agitated autoclave at atmospheric pressure. A sample is determined by gas chromatography. It is found that 99.65% of the original lactam is converted. Then 120 kg of alpha, omega-dihydroxy-(polytetrahydrofuran) of molecular mass 1,000 (120 moles) and 13.3 kg of water are added, the mixture is stirred at a pressure of about 18 bars generated in the closed vessel at a temperature of 230° to 260° C. for 2 hours. The vessel is then decompressed for 2 hours while the temperature is raised to 270° C. The polycondensation takes place at atmospheric pressure with nitrogen passing over. After 14 hours, a product with a relative viscosity value of 1.94 is obtained. A tear resistance of 28 N/$mm^2$ as measured by German Industrial Standard DIN 53 455 is obtained for molded bodies. The material is extruded into films. No specks of gel are observed.

EXAMPLE 2

315.2 kg of lauryl lactam (1,600 moles); 16.56 kg of decane dicarboxylic acid (72 moles) and 0.2 kg of phosphoric acid are heated for 3 hours under a nitrogen atmosphere to 280° C. in a 1 $m^3$ agitating autoclave at atmospheric pressure. The polymer so obtained contains 0.4% by weight of lauryl lactam. Thereupon 75.6 kg of alpha, omega-dihydroxy-(polytetrahydrofuran) or molecular mass 1,000 (75.6 moles) and 15.7 kg of water are added and the mixture is stirred for 1 hour at 230° to 260° C. in the closed autoclave at the pressure of about 20 bars generated therein. The reactor is decompressed within 2 hours, while the temperature is raised to 270° C. A vacuum of 100 mbars is applied within 3 hours and maintained for 7 hours. The product so obtained has a relative viscosity value of 1.98. Its extract content in hot ethanol is 2.3% by weight. No decrease in its mechanical properties could be observed following storage for 2 months at room temperature.

COMPARATIVE EXAMPLE (Corresponding to West German Published Application No. 21 35 770 method)

315.2 kg of lauryl lactam (1,600 moles); 48.65 kg of polyetherester from (7.01 kg of adipic acid (48 moles) and 43.34 kg of alpha, omega-dihydroxy-(polytetrahydrofuran) of molecular mass 860 (50.4 moles) and 0.4 kg of phosphoric acid were heated to 280° C. for 16 hours in a 1 m³ mixing vessel. Then N₂ is made to pass over for 5 hours at 260° C. and a vacuum of 1 mbar is applied for 10 hours. Of the input of lauryl lactam, 18% were recovered. The brown and brittle material so obtained had a relative viscosity value of 1.62.

EXAMPLE 3

315.2 kg of lauryl lactam (1,600 moles); 7.01 kg of adipic acid (48 moles) and 0.4 kg of phosphoric acid were heated to 280° C. for 4 hours in a 1 m³ agitated autoclave at atmospheric pressure with air being excluded. The polymer so obtained contained 0.45% by weight of lauryl lactam. 43.34 Kg of alpha, omega-dihydroxy-(polytetrahydrofuran) of molecular mass 860 (50.4 moles) and 15 kg of water is then added, and the mixture is stirred for 2 hours in the closed vessel at the pressure of 18 bars generated therein. Then the vessel is decompressed for 2 hours while the temperature is raised to 260° C. The polycondensation took place while passing nitrogen and at ordinary pressure. After 11 hours a product with a relative viscosity value of 2.0 is obtained. The lactam content of the product amounts to 0.05% by weight.

EXAMPLE 4

315.2 kg of lauryl lactam (1,600 moles); 39.84 kg of isophthalic acid (240 moles) and 0.12 kg of phosphoric acid are heated to 290° C. for 1 hour in 1 m³ agitated autoclave under atmospheric pressure. The prepolymer so obtained contains 0.8% by weight of lauryl lactam. The 159.9 kg of alpha, omega-dihydroxy-(polytetrahydrofuran) of molecular mass 650 (246 moles) and 14.8 kg of water are added, and the mixture is stirred at a water vapor pressure of 19 bars for 30 minutes in the closed vessel. Then the vessel is decompressed for 2 hours while the temperature is raised to 270° C. At this temperature, nitrogen is passed over for 5 hours, and the vacuum of 90 mbars is applied for 7 hours. The product so obtained has a relative viscosity value of 2.1 and a lactam content 0.04% by weight.

EXAMPLE 5

157.6 kg of lauryl lactam (800 moles); 112.8 kg of capryllactam (800 moles); 6.02 kg of azelaic acid (31.05 moles) and 0.3 kg of phosphoric acid are heated for 7½ hours to 285° C. in a 1 m³ agitated autoclave under atmospheric pressure. The prepolymer so obtained contains 0.75% by weight of lauryl lactam. 34.15 kg of polytetrahydrofuran diamine having a molecular mass 1,100 (31.05 moles) and 14.2 kg of water are added, the mixture is stirred for 1½ hours at a pressure of 18 bars generated in the closed vessel, then decompressed for 2 hours while the temperature is raised to 260° C. At this temperature nitrogen is passed over for 8 hours. The product so obtained has a relative viscosity value of 2.05 and a lactam content of 0.12% by weight.

I claim:

1. A method for preparing polyether ester amides, comprising:
   (a) preparing polyamides having carboxyl end groups by melting a mixture of lactams having at least 8 carbon atoms with dicarboxylic acids in a molar ratio of 100/1 to 100/15 in the presence of a polyamide catalyst and in an inert gas atmosphere at atmospheric pressure and in the absence of water, at temperatures from about 230° to 300° C., said melting continuing for sufficient time to react at least 98% of said lactams;
   (b) mixing sufficient water and polyether with the reaction product of (a) to form said polyether ester amide;
   (c) treating the mixture obtained in (b) at a temperature between about 200° to 300° C. and under the vapor pressure of said water added in (b) to about 5 to 25 bars pressure with mechanical agitation;
   (d) removing said water from (c) by decompression; and
   (e) polycondensing the product of (d) to form said polyether ester amide.

2. The method of claim 1 wherein said lactams and said dicarboxylic acids are used in molar ratios from 100/2 to 100/10.

3. The method of claim 1 wherein said lactams and said dicarboxylic acids are used in molar ratios from 100/3 to 100/7.

4. The method of claim 1 wherein said lactams include lauryl lactam and said polyethers include alpha, omega-dihydroxy-(polytetrahydrofuran).

5. Molded articles of high impact strength at low temperatures prepared from the polyether ester amides of claim 1.

6. The method of claim 1, wherein said polyamide catalyst is selected from the group consisting of phosphoric acid, amine salts of phosphoric acid, zinc acetate and calcium acetate in amounts of about 0.01 to 0.3% by weight based on total polyamides.

7. The method of claim 6, wherein said polyamide catalyst is phosphoric acid in amounts of about 0.02 to 0.1% by weight based on total polyamides.

8. The method of claim 1, wherein said polyether ester amide of step (e) has a relative solution viscosity of about 1.4 to 2.4 as measured in m-cresol at 25° C. according to German Industrial Standard 53 727.

* * * * *